M. J. BRAY.
SPLICING THIMBLE.
APPLICATION FILED SEPT. 23, 1919.
1,327,856.
Patented Jan. 13, 1920.
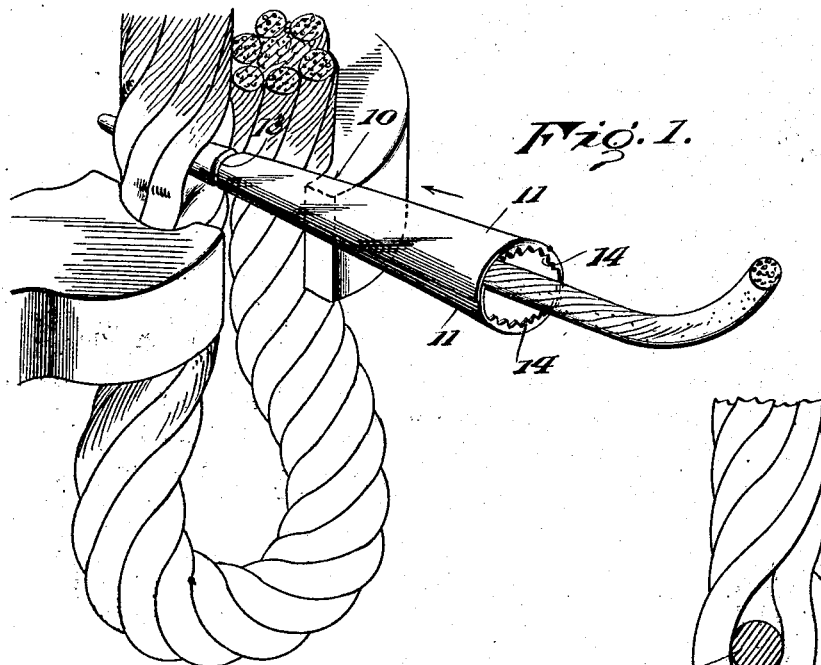
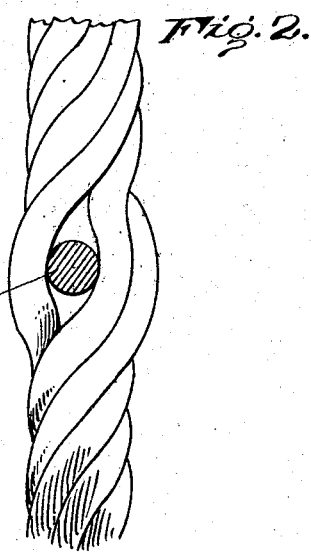
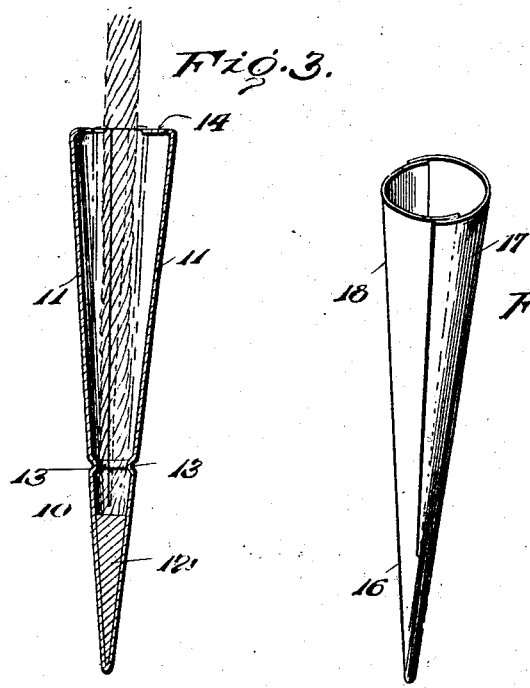
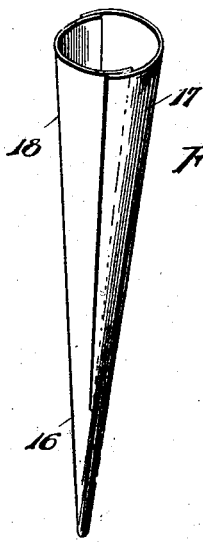
Inventor
M. J. Bray
by *Lacey & Lacey*
his Atty's

UNITED STATES PATENT OFFICE.

MICHAEL J. BRAY, OF UPLAND, PENNSYLVANIA.

SPLICING-THIMBLE.

1,327,856.   Specification of Letters Patent.   Patented Jan. 13, 1920.

Application filed September 23, 1919. Serial No. 325,812.

*To all whom it may concern:*

Be it known that I, MICHAEL J. BRAY, citizen of the United States, residing at Upland, in the county of Delaware and State of Pennsylvania, have invented certain new and useful Improvements in Splicing-Thimbles, of which the following is a specification.

This invention relates to an improved splicing thimble particularly designed for use in splicing cables and has as one of its principal objects to provide a thimble which when positioned upon the end portion of a cable will serve to inclose the jagged ends of the wires of the cable strands for thus effectually protecting the hands of the operator when splicing the cable.

The invention has as a further object to provide a splicing thimble so constructed that an end portion of a cable may be freely inserted therein but wherein, when the thimble is grasped incident to its manipulation, the thimble will effectually grip the end portion of the cable and thus be prevented from slipping therefrom.

A still further object of the invention in this connection is to provide a thimble employing a conical shell having its larger end of such diameter that an end portion of a cable may be easily inserted therein and wherein the shell will be split for the major portion of its length so that the shell may be contracted about the cable end.

A further object of the invention is to provide a thimble wherein the split portions of the shell will in effect, provide coacting jaws movable to grip the cable and wherein the said jaws will be formed with teeth adapted to impinge against the cable for effectually preventing slipping of the thimble.

The invention has as a still further object to provide a thimble having an annular gripping ring so disposed as to engage a cable immediately contiguous to the end thereof so that when the shell of the thimble is contracted, said rib will act to compress the frayed ends of the strands of the cable.

And the invention has as a still further object to provide a thimble wherein the shell thereof will be equipped at its smaller end with a solid core so as to prevent crumpling of the pointed end of the thimble.

Other and incidental objects will appear hereinafter. In the drawings:

Figure 1 is a perspective view showing my improved thimble in use, a portion of the cable being shown as held by a conventional vise, Fig. 2 is a fragmentary elevation showing the manner in which a marlinspike is, in accordance with usual practice, first driven between the strands of a cable in the splicing operation thereof, Fig. 3 is a vertical sectional view showing the thimble applied, and Fig. 4 is a detail perspective view showing a slight modification of the invention.

In carrying the invention into effect, I employ a hollow conical shell 10. This shell may, of course, be varied in size to suit different requirements and is preferably formed of suitable resilient sheet metal. Throughout the major portion of its length the shell is split medially from its larger end to define coacting gripping jaws 11 fitting one within the other and slightly overlapping. Thus, as will be seen, when the larger end of the shell is grasped, these jaws will be flexed at their inner ends and will slide one within the other to permit contraction of the larger end portion of the shell. Within the pointed end of the shell is fixed a suitable solid core 12 adapted to reinforce the wall of the shell at its smaller end portion so that the pointed end of the shell will be prevented from crumpling. Consequently, the pointed end of the shell may be driven between the strands of a cable without likelihood of injury to the shell. Pressed in from the wall of the shell immediately in the rear of the core 12 are arcuate gripping ribs 13 disposed in alinement and carried one by each of the jaws 11 and formed on each of the jaws at its outer end is an arcuate series of teeth 14. As best shown in Fig. 1, these series of teeth are directed laterally and inwardly toward each other and thus overhang the larger end of the shell. As will thus be seen, the complete thimble is very simple in its construction and accordingly may be economically produced.

In order that the structural advantages of my improved thimble may be accurately understood I have, in the drawings, shown the manner in which the device is used. In splicing a cable it is customary, as suggested in Fig. 1, to first fix one portion of the cable in a vise. A marlinspike is, as illustrated in Fig. 2, then driven between the strands of the fixed portion of the cable for spreading the strands apart. In this figure a marlinspike is conventionally illustrated at 15.

This done, the thimble is then fitted over the other portion of the cable at the broken end thereof when the thimble may be grasped for threading the latter end portion of the cable between the spread strands of the first portion thereof, the operation of spreading the strands and threading one end portion of the cable back and forth through the other end portion thereof being, of course, continued until the splicing operation is completed.

Attention is now directed to the fact that since the thimble is normally much larger, at its larger end, than the cable, the adjacent end portion of the cable may be readily inserted into the shell. As the end portion of the cable is advanced into the shell, the frayed ends of the wires of the cable strands will, of course, be forced together so that the end of the cable may, as particularly shown in Fig. 3, be forced beyond the ribs 13 of the thimble to abut the core 12. When the larger end portion of the thimble is then grasped, incident to manipulation of the thimble, the jaws 11 will be flexed longitudinally and this flexing of the jaws will, as will be seen, serve to contract the larger end portion of the shell about the end portion of the cable, one of the jaws sliding within the other so that both of the jaws will move into binding engagement with the cable. Coincident with the flexing of the jaws the ribs 13 carried by the jaws will fulcrum upon the cable immediately contiguous to its broken end so that said ribs will coact for compressing the frayed strands of the cable while the ribs will effectually grip the cable. At the same time, the teeth 14 at the outer ends of the jaws will be moved to impinge against and bite into the cable so that, as will be seen, the ribs 13 and teeth 14 will grip the cable at spaced points thereon. Consequently, when the thimble is inserted between the strands of the cable, as suggested in Fig. 1, and is grasped for drawing an end portion of the cable between the strands, the thimble will be effectually prevented from slipping from the cable end.

In Fig. 4 of the drawings, I have illustrated a slight modification of the invention wherein a hollow conical shell 16 is employed. This shell is substantially a counterpart of the shell of the preferred construction and from its larger end is split medially throughout the major portion of its length to define coacting jaws 17 fitting one within the other. However, in this modified structure, the core 12 is eliminated as well as the ribs 13 and teeth 14 as exemplified in the preferred construction. This modified form of thimble thus provides a device particularly simple in its structure.

Having thus described the invention, what is claimed as new is:

1. A splicing thimble including a hollow shell pointed at one end and split for a portion of its length to define coacting jaws fitting one within the other and movable into binding engagement with a cable received within the shell.

2. A splicing thimble including a hollow shell pointed at one end and split for a portion of its length to define coacting jaws provided with gripping teeth, the jaws fitting one within the other and being movable into binding engagement with a cable received within the shell and engaged by said teeth.

In testimony whereof I affix my signature.

MICHAEL J. BRAY. [L. S.]